Oct. 7, 1952 D. G. C. HARE 2,613,286

CATHODE FOLLOWER AMPLIFIER

Filed June 20, 1947

INVENTOR
DONALD G. C. HARE
BY
Norman [signature]
ATTORNEY

Patented Oct. 7, 1952

2,613,286

UNITED STATES PATENT OFFICE 2,613,286

CATHODE FOLLOWER AMPLIFIER

Donald G. C. Hare, Clemson, S. C., assignor to Deering Milliken Research Trust, New York, N. Y., a nonprofit trust of New York Application June 20, 1947, Serial No. 756,070

5 Claims. (Cl. 179—171)

The present invention relates to electronic apparatus and comprises an improved circuit arrangement for translating an input signal into an output current or voltage varying in response to changes in the input signal. More specifically, the invention comprises a new cathode follower which is sensitive and efficient.

In a conventional cathode follower circuit, the output circuit is connected across an impedance in the cathode circuit of an amplifier tube. In such conventional cathode follower circuit, energy is dissipated in the cathode impedance and hence energy transference is effected relatively inefficiently. In the new circuit of the invention, this disadvantage inherent in the conventional cathode follower is substantially overcome.

For an understanding of the invention, reference may be had to the drawing of which:

Figure 1:
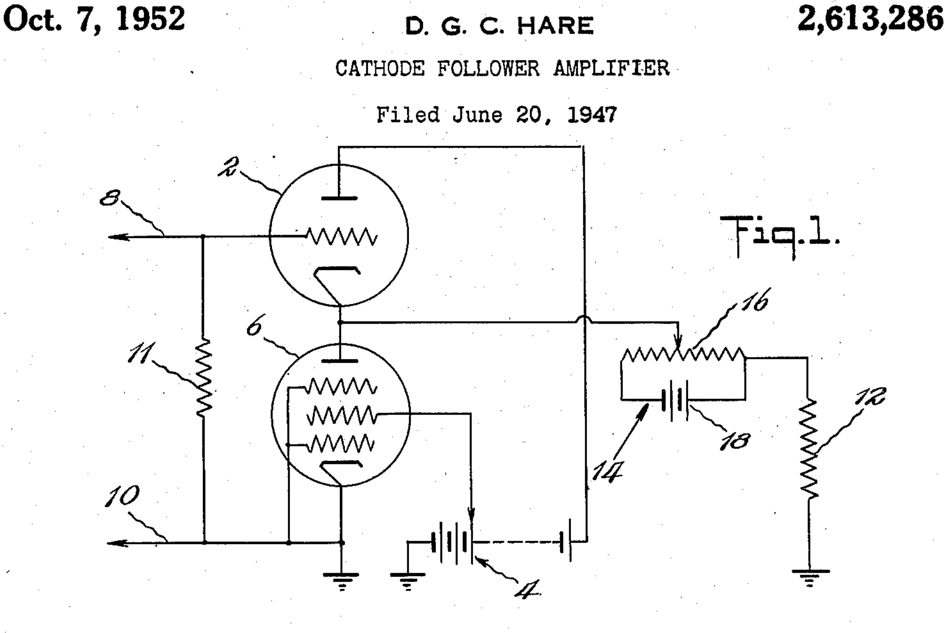
Fig. 1 is a circuit diagram of a cathode follower embodying the invention.

In Fig. 1 a triode 2 is shown as having its anode connected directly to a source of positive potential, indicated diagrammatically as a battery 4, and its cathode connected to the anode of a pentode 6. The cathode of tube 6 is connected to the negative terminal of the source 4, shown diagrammatically as ground. The screen grid of tube 6 is connected to the power supply at a point of potential substantially lower than that applied to the anode of tube 2 and the suppressor and control grids of tube 6 are connected directly to the cathode thereof. The input circuit, indicated as comprising leads 8 and 10 interconnected by resistor 11, is connected across the control grid of tube 2 and the cathode of tube 6 and the output circuit is connected across tube 6. In the particular embodiment of the invention illustrated in Fig. 1, the output circuit comprises a resistor 12, one end of which is grounded and the other end of which is connected to the anode of pentode 6 through a potentiometer circuit 14 which introduces a bucking potential into the output circuit. As shown, the circuit 14 comprises a resistor 16 connected across a battery 18 and having a tap connected to the anode of tube 6; the high potential end of resistor 16 being connected to resistor 12. Resistor 12 may be considered as any load, the magnitude of current through which, or the voltage across which, is to be varied in response to a control signal appearing in the input circuit.

With the above described circuit of Fig. 1, when no signal is impressed upon the input circuit, current flows through tubes 2 and 6 in series. The tap on resistor 16 may be adjusted so that, under conditions of no signal, no current flows in the output circuit. The potential on the control grid of pentode 6, being constant, the tube operates under conditions of high dynamic impedance and hence the tube is, in effect, a constant current device. When a signal appears across the input circuit such as to increase the current through tube 2, substantially the entire incremental current appears in the output circuit. Thus, by operating the triode 2 on the straight part of its characteristic, a substantially linear relationship is obtained between the impressed signal and the output current or voltage and the operation of the circuit, because of the action of the pentode as a constant current device, is effected with minimum dissipation of energy and hence with high efficiency. With triode 2 a tube with high mutual conductance, such as 2A3, the output circuit may be made to respond to small changes in impressed signal and hence high sensitivity may be obtained.

In Fig. 1 the constant current device, the pentode 6, has been shown as operating with zero bias on its control grid, and the output circuit has been shown arranged to draw no current under conditions of no input signal. Obviously, if it is desired that the pentode pass less current, a negative bias could be given to the control grid thereof, and if an output current under conditions of no signal is desired, the bucking potential device could be omitted or adjusted to insert a lower opposing potential in the output circuit. Also, although the tube 2 has been described and illustrated as a triode, a tetrode or pentode with its elements connected for operation as a triode, could be employed as tube 2.

Figure 2:
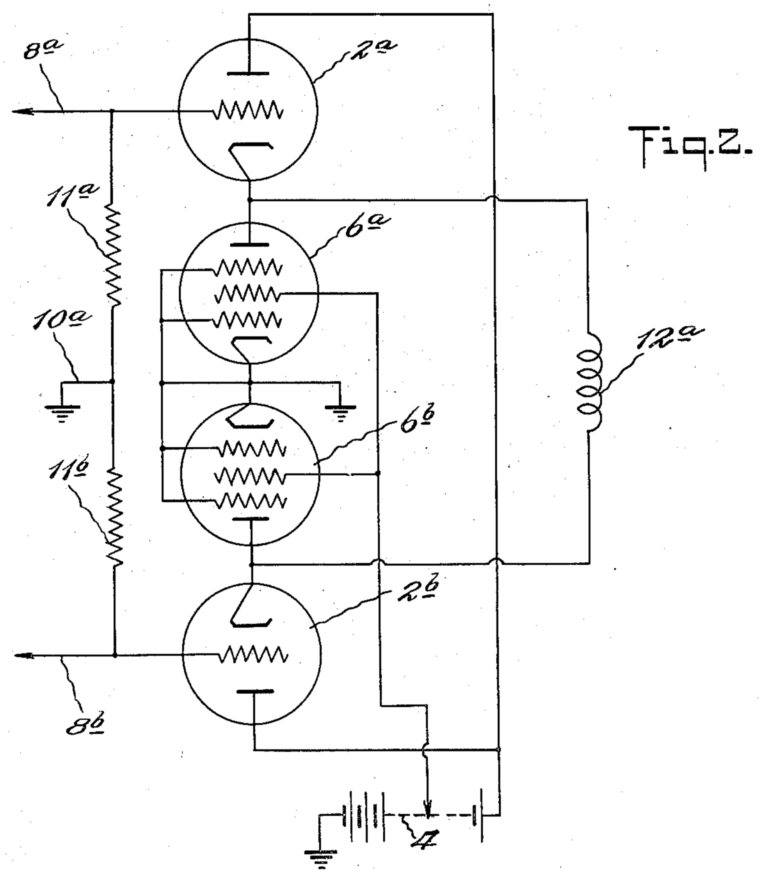
Fig. 2 is a circuit diagram showing circuits of the type of Fig. 1 arranged in push-pull relation.

If it is desired that additional output or symmetrical operation be obtained, or that the steady state direct current component be eliminated from the output circuit, the push-pull arrangement of Fig. 2 may be employed. In Fig. 2, two triodes, 2*a* and 2*b* and two pentodes, 6*a* and 6*b* are provided. The input circuit, comprising the leads 8*a* and 8*b*, interconnected by resistors 11*a* and 11*b*, is connected across the control grids of tubes 2*a* and 2*b*; the junction of resistors 11*a* and 11*b* being grounded at 10*a*. The anodes of tubes 2*a* and 2*b* are connected in parallel to the positive terminal of the source 4 and the cathodes of these tubes are connected respectively to the anodes of tubes 6*a* and 6*b*; the cathodes of tubes 6*a* and 6*b* being grounded. The output circuit, indicated as a winding 12*a*, is connected across the anodes of the pentodes 6a and 6b. The control grids of the pentodes are indicated as tied to their cathodes so that the tubes operate with zero bias, although a constant biasing potential could be applied to the control grids if desired.

With the above described circuit of Fig. 2, the pentodes operate as constant current devices and hence the current through these tubes is substantially unaffected when a signal is impressed across the input circuit. When no signal is impressed on the circuit, the cathode of tubes 2a and 2b are at equal potential and hence no current flows through the output circuit. When a signal appears in the input circuit, such, for example, as to make the grid of tube 2a positive and that of tube 2b negative, the cathode potential of tube 2a will increase and that of tube 2b will decrease with consequent flow of current through the output circuit in a direction from triode 2a through pentode 6b to ground. As the pentodes 6a and 6b operate as constant current devices, such current in the output circuit will correspond substantially to the incremental flow through tube 2a. When the input signal reverses, the direction of current flow through the output circuit will likewise reverse and its magnitude will vary with the magnitude of the signal. Thus, as with the circuit of Fig. 1, the provision of the constant current devices in the cathode circuits insures minimum dissipation of energy and efficient operation of the cathode follower.

The invention has now been described with reference to two embodiments thereof. Obviously, various changes in the particular circuits shown in the drawing could be made without departing from the spirit of the invention. For example, the input circuits have been described as having a double ended signal impressed thereon; but obviously, either a single ended or double ended signal could be impressed upon the circuit. No specific means for initial adjustment of the circuits have been described or illustrated as such means may be provided if needed, as is well known to those skilled in the art. Any suitable plate and grid voltages may be used for the tubes provided only that, for most efficient operation, the pentodes in the cathode circuits of the triodes should operate with high dynamic impedance. With the circuit of Fig. 2, high power amplification and sensitive operation has been obtained with the anodes of tubes 2a and 2b at 300 volts and the screen grids of tubes 6a and 6b at 45 volts. Resistors 11a and 11b may be of the order of one megohm.

The following is claimed:

1. A cathode follower comprising in combination an electron tube operating as a triode, an input circuit connected to the control grid of said tube, a pentode having its plate tied to the cathode of said first mentioned tube to be at the same potential therewith, means for applying, with respect to the cathode of said pentode, a substantially constant positive potential to the anode of said first mentioned tube and a substantially constant, but lesser, positive potential to the screen grid of said pentode, means for maintaining the potential of the control grid of said pentode substantially fixed with respect to the cathode of said pentode and an output circuit connected across said pentode.

2. A cathode follower circuit comprising an electron tube having an anode, a control grid and a cathode, a constant current electron device having anode and cathode elements, the anode element being tied to said electron tube cathode to be at the same potential therewith, means for applying a constant potential difference across said anode and the cathode element of said constant current device, a signal input circuit connected across said control grid and cathode and an output circuit connected across said constant current device.

3. The cathode follower circuit according to claim 2 wherein said constant current device is a pentode having its anode tied to the cathode of said tube and connected to said output circuit.

4. A cathode follower circuit comprising a pair of electron tubes, each having a cathode, a control grid and an anode, a pair of constant current electron devices, each having anode and cathode elements, the cathode elements of said constant current devices being at the same fixed potential, the anode element of one constant current device being tied to the cathode of one of said tubes to be at the same potential therewith and the anode element of the other of said constant current devices being tied to the cathode of the other of said tubes to be at the same potential therewith, means for applying a constant potential above that of the cathode elements of said constant current devices to the anodes of said tubes, an input circuit connected to said control grids and an output circuit connected across the anode elements of said constant current devices.

5. The cathode follower circuit according to claim 4 wherein said constant current devices are pentodes having their anodes tied to the cathodes of said tubes and connected to said output circuit and having their cathodes tied together.

DONALD G. C. HARE.

REFERENCES CITED

The following references are of record in the file of this patent:

UNITED STATES PATENTS

| Number | Name | Date |
|---|---|---|
| 2,171,614 | Wendt | Sept. 5, 1939 |
| 2,269,001 | Blumlein | Jan. 6, 1942 |
| 2,326,614 | Bowman | Aug. 10, 1943 |
| 2,358,428 | White | Sept. 19, 1944 |
| 2,423,931 | Etter | July 15, 1947 |
| 2,428,295 | Scantlebury | Sept. 30, 1947 |
| 2,435,579 | Francis | Feb. 10, 1948 |
| 2,443,864 | MacAuley | June 22, 1948 |
| 2,516,865 | Ginzton | Aug. 1, 1950 |